Nov. 5, 1957  W. C. McCLURE  2,811,820

COTTON PICKING SPINDLE WITH RETRACTABLE TINES

Filed May 27, 1954

Weldon C. McClure
INVENTOR.

BY

ATTORNEY

United States Patent Office 2,811,820
Patented Nov. 5, 1957

2,811,820

COTTON PICKING SPINDLE WITH RETRACTABLE TINES

Weldon C. McClure, Brownfield, Tex.

Application May 27, 1954, Serial No. 432,671

5 Claims. (Cl. 56—50)

This invention relates to cotton harvesting machines and more particularly to fiber gathering spindles for cotton harvesting machines.

The principal object of the invention is to improve upon the picker or gathering spindles of harvesting machines in which the spindle actuating mechanism is designed to thrust alternate groups of picking spindles into the cotton bearing stalks and withdraw the same therefrom while at the same time rotating the spindle to ensnare cotton from open bolls on the stalks and deposit the same, in retracted position of the spindles, into suitable means for transferring the cotton to a conveyance.

Another object of the invention is to provide a cotton picking or gathering spindle whose design and construction enables the spindle to pluck open cotton from the bolls without wetting the same, tearing or otherwise injuring the staple, and which freely releases the harvested cotton into the harvesting machine for transfer, by whatever means is employed in the machine, to its cotton receiver.

Still another object of the invention is to provide a cotton picking or gathering spindle composed of a tapered, cylindrical shell adapted to be freely mounted on the spindle shaft of a cotton harvesting machine for movement into and out of the cotton stalks, said shell having circumferentailly spaced, longitudinal slots through which are projected the ends of picking tines as the spindle advances into the stalks to impale cotton thereon, and as the spindle retracts, the tines withdraw into the shell to disengage the cotton therefrom. The tines are carried by rods in longitudinally spaced relationship thereon to form combs, the rods being spaced circumferentially about the spindle shaft extending axially through the cylindrical shell and have their ends rotatably journaled in front and rear disc-like plates or comb holders which are permanently affiixed on the spindle shaft. Provision is made to interconnect the spindle shaft and the spindle shell for clockwise rotation of the latter after the spindle shaft is advanced to project the tines and upon reversal of the spindle shaft during its withdrawal the holders will turn in a counter-clockwise direction to retract the tines.

Other objects will appear as the description proceeds when considered with the annexed drawing wherein.

By way of example, the invention described herein may be said to be operative through the spindle actuating mechanism of such a patent as Smith, No. 2,261,572.

Figure 1:
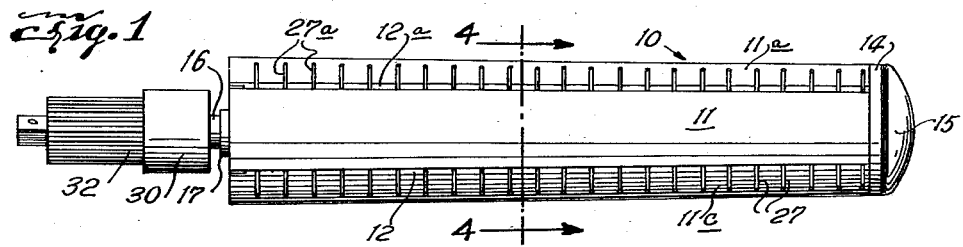
Figure 1 is a side elevational view of a fiber gathering spindle constructed according to the invention.
Figure 2:
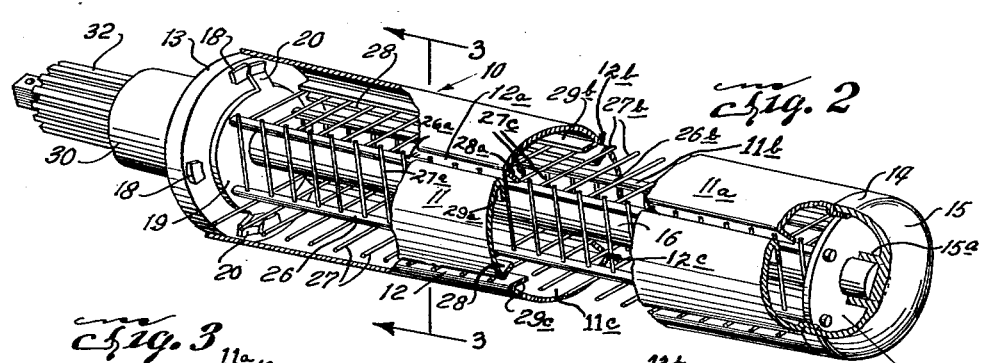
Figure 2 is a perspective view thereof with parts of the shell broken away and shown in section to reveal the tine combs.

Continuing with a more detailed description of the drawing, reference is primarily made to Figure 1 wherein is shown a slightly tapered shell 10, made up of a series of longitudinal, annularly spaced segments 11, 11a, 11b and 11c whose relative spacing is such that longitudinal slots 12, 12a, 12b and 12c are defined between the segments. At the rear end of the spindle shell 10 the ends of the segments are joined to the perimeter of a circular butt plate 13 while the opposite ends of the segments are secured to the annular flange 14 of a concavo-convex tip 15 whose rounded exterior facilitates entry of the reduced forward end of the shell 10 into the foliage of cotton stalks.

Figures 9, 10:
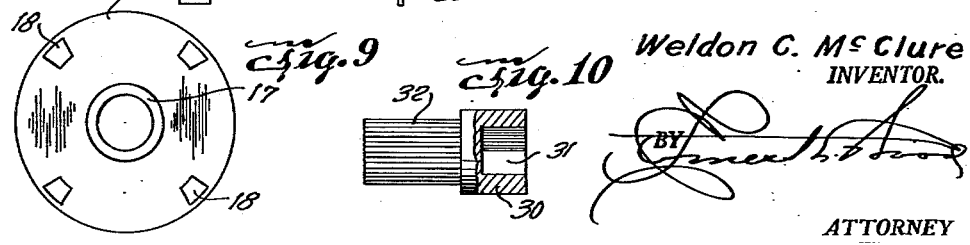
Figure 9 is a front elevational view of the butt plate which locks the comb holders for rotation with the spindle shell.
Figure 10 is a detail view, with parts broken away and shown in section showing a driving gear having a socket adapted to receive the squared end of the spindle shaft.

The tip 15 is formed with a hollow boss 15a on its concave inner surface defining a bearing for the outer end of a spindle shaft 16 in which the shaft operates freely. The shaft extends freely through a collar bearing 17 (Figure 9) and axially through the shell 10. The butt plate 13 is provided, on its inner face with four lugs 18 which are appropriately spaced annularly near the perimeter of the butt plate. Further reference to these lugs will be made presently.

Affixed to the spindle shaft 16 adjacent to and forwardly of the butt plate 13 is a disc 19 which is referred to herein as the rear comb holder. This holder has formed thereon or affixed thereto diametrically opposed arms 20 which project beyond the rearwardly of the preiphery of the holder 19 where they rest slidably against the inner face of the butt plate 13. Thus, it will be seen that when the spindle shaft 16 is revolved in one direction, the shell 10 will remain stationary until the arms 20 are brought up against a pair of diametrically opposed lugs 18, whereupon the shaft and shell will turn in unison.

At the opposite end of the picker spindle, a disc 21 is affixed to the shaft 16 adjacent its forward end. This disc is referred to herein as the forward comb holder. The rear comb holder 19 is provided with a series of holes 22, spaced annularly about the central hole 23 which receives the spindle shaft 16. Corresponding holes 24 are similarly arranged in the front comb holder 21 about the central opening 25 therein which receives the shaft 16 adjacent its opposite or forward end. A series of rods 26, 26a, 26b and 26c are grouped about the spindle shaft 16, each having an end rotatably journaled in a hole 22 in the rear comb holder 19 and its opposite end journaled in a corresponding hole 24 in the forward comb holder 21. Affixed to each of the rods 26, 26a, 26b and 26c in longitudinally spaced relationship is a series of tines 27, 27a, 27b and 27c, the last tine at each end of each row of tines being disposed in juxtaposition to a comb holder 19 or 21 to prevent longitudinal displacement of the rods 26, 26a, 26b and 26c to the extent that they may become dislodged from their respective holes 22—24 in the comb holders. The rods 26, 26a, 26b and 26c and their respective rows of tines 27, 27a, 27b and 27c constitute tine combs and are so referred to herein.

Figures 3, 4:
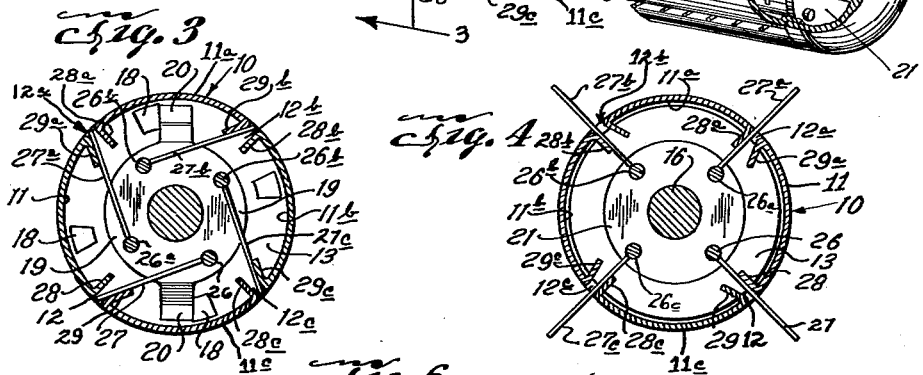
Figure 3 is a transverse sectional view taken on line 3—3 of Figure 2.
Figure 4 is a transverse sectional view taken on line 4—4 of Figure 1.
Figures 5, 6, 7, 8:
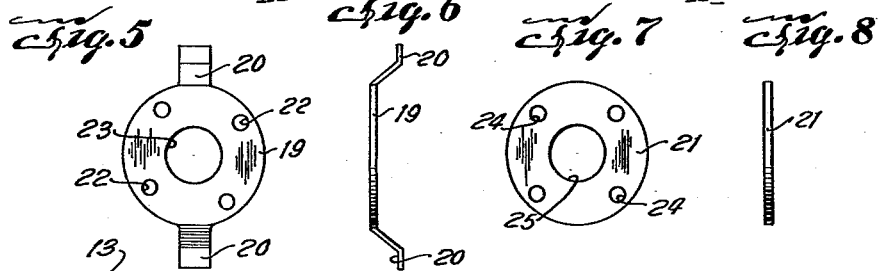
Figure 5 is a front elevational view of the rear comb holder.
Figure 6 is an edge view of the comb holder shown in Figure 5.
Figure 7 shows the front comb holder.
Figure 8 is an edge view of the comb holder shown in Figure 7.

It will be observed in Figure 1 that the tines 27, 27a, 27b and 27c become progressively shorter from the rear to the forward end of the shell 10 hence to correspond to the taper of the shell. Also, it will be seen in Figures 3 and 4 that the segments 11, 11a, 11b and 11c of the shell 10 have longitudinally extending flanges 28, 28a, 28b and 28c along one edge turned inwardly at an angle of 90° and these flanges lie opposite to the flanges 29, 29a, 29b and 29c of the next adjacent segments which are disposed at an angle less than 90°. The flanges 29, 29a, 29b and 29c of adjacent segments 11, 11a, 11b and 11c of the shell 10 afford supporting or bearing surfaces for the groups of tines 27, 27a, 27b and 27c of the tine combs as they slide in and out through the slots 12, 12a, 12b and 12c. During such movement of the tine combs, which is caused by rotation of the spindle shaft 16 independently of the shell 10, the tines assume a retracted position tangent to the longitudinal axis of the spindle shaft 16, as shown in Figure 3 and in such position a flange 29, 29a, 29b and 29c on a shell segment 11, 11a, 11b and 11c affords the bearing surface. When the tines are extended to the positions shown in Figure 4, the flanges 28, 28a, 28b and 28c becomes the bearing surfaces and in either case, these flanges permit full retraction of the free ends of the tines below the common peripheral surface of the shell 10 without danger of their detachment from their respective slots 12, 12a, 12b and 12c.

The spindle shaft 16 has a squared rear end which is received in the bushing 30 having a squared socket 31. The bushing 30 is formed integral with a driving gear 32 (Figure 10) which latter cooperates with gears in the spindle reciprocating and rotating mechanism of the harvesting machine on which the picking spindle herein described is adapted to operate.

In assembling the picker spindle, the comb holders 19 and 21 are permanently affixed to the spindle shaft 16. The comb shafts or rods 26, 26a, 26b and 26c are made of spring steel and are sprung into an arc so that their ends may be inserted into their respective holes 22 and 24 in the comb holders 19 and 21.

The ends of the shell segments 11, 11a, 11b and 11c are affixed permanently to the flange 14 of the tip 15 and the spindle shaft 16, with the tine combs extended is then inserted into the spindle shell 10, each row of tines sliding down its flanged slot into the spindle shell and the forward end of the shaft is stabbed into the hollow boss 15a of the tip 15. Holding the partially assembled spindle in this position, the butt plate 13 is thrust onto the rear end of the spindle shaft 16 and moved into a position where its inner face will engage the arms 20 of the rear comb holder 19. The butt plate 13 is then turned on the shaft 16 to a point where a pair of diametrically opposed stop lugs 18 of the butt plate is in engagement with the diametrically opposed arms 20 of the butt plate 13. In this position, the plate is permanently affixed to the rear ends of the shell segments 11, 11a, 11b and 11c.

In operation: as the spindle shaft 16 is turned forwardly within the stationary shell 10, the tine combs, whose ends are retracted within their respective slots 12, 12a, 12b and 12c of the shell, will begin to emerge from the shell with forward motion of the shaft 16 within the shell and will continue to emerge until the tangent angle (Figure 3) of the tine combs to the shaft becomes an angle of 90° (Figure 4). At this point, the arms 20 of the rear comb holder 19 will contact the pair of stop lugs 18 on the butt plate 13 and further forward turning of the shaft will cause the shell to turn also with the tines fully protruded.

Reversing the rotation of the shaft 16 with the shell 10 stationary, the tine combs will begin to recede into the shell 10 from their position of 90° toward their position as shown in Figure 3, at which point the arms 20 of the comb holder 19 will be brought up against the companion pair of lugs 18 on the butt plate. In this latter position, the tines 27 are fully retracted within the shell and their ends are resting between the flanges 28—29, 28a—29a—28b—29b and 28c and 29c of the shell segments 11, 11a, 11b and 11c, respectively. Thus, both shell and shaft will turn in unison with the tines fully retracted.

It is understood that as the spindle shaft 16 is rotated as described, it is also being reciprocated by the reciprocating mechanism of the harvesting machine. As the picker spindles are thrust forwardly or outwardly, usually in opposing groups, the shell 10 is held stationary by reason of its frictional contact with the foliage or branches of the stalks of cotton on opposite sides of which the groups of spindles are moved. The rotating shaft 16 causes the tines 27, 27a, 27b and 27c to protrude until the arms 20 contact one pair of lugs 18 and when fully extended, the tines engage the open cotton, withdrawing it from the bolls. With the tines fully extended, the shell 10 begins to rotate as the picker spindle is retracted to a position where the cotton impaled upon the tines can be deposited into the harvesting machine. When this position is reached, the direction of rotation of shaft 16 is reversed, causing the tines 27, 27a, 27b and 27c to recede into the shell 10, thus to release the impaled cotton. Almost instantly, the operation is repeated, the speed of rotation and reciprocation of the picking spindle being quite rapid.

Manifestly, the construction as shown and described is capable of some modification and such modification as may be construed to fall within the scope and meaning of the appended claims is also considered to be within the spirit and intent of the invention.

I claim:

1. A gathering spindle for cotton harvestering machines comprising a rotatable and longitudinally reciprocable shaft, a tapered elongate shell freely mounted on said shaft and having a series of longitudinal, circumferentially spaced slots therein, a tine comb holder affixed to said shaft within and adjacent each end of said shell, a series of tine combs annularly spaced about said shaft each consisting of a rod having its ends rotatably journaled in opposing comb holders and provided with a multiplicity of tines spaced longitudinally thereon and extending into the slots of said shell, diametrically opposed lugs carried by said shell diametrically opposed, medial arms carried by one of said comb holders cooperating with said lugs for effecting engagement and disengagement between said shell with said shaft to cause said tines to respectively protrude and recede in the slots of said shell as said shaft is rotated and reciprocated.

2. A gathering spindle for cotton harvesting machines comprising a rotatable and reciprocable shaft, an elongate, tapered shell freely mounted on said shaft and having longitudinally coextensive slots spaced annularly about the same a tine comb holder on said shaft at each end of said shell, a series of rods having their ends rotatably journaled in said comb holders and grouped about said shaft in longitudinal relationship therewith, each having a row of longitudinally spaced tines extending into the slots of said shell, a butt plate in one end of said shell, a plurality of annularly spaced lugs on said butt plate, a pair of diametrically opposed arms on one of said holders adjacent said butt plate and cooperating with said lugs for locking said shaft and shell for common rotation to cause said tines to protrude from said slots during rotation and reciprocation of said shaft and shell in one direction, said means being effective to cause said tines to recede into said shell when said shaft is rotated and reciprocated in an opposite direction.

3. A picking spindle for a cotton harvesting machine comprising an oscillatable and reciprocable shaft, an elongate and tapered shell freely mounted on said shaft and composed of longitudinally coextensive segments annularly spaced apart to define having longitudinally coextensive slots spaced about its circumference, a holder stationary with said shaft in each end of said shell, a plurality of longitudinally disposed rods having their ends journalled in said holders and spaced annularly about said shaft within said shell, for oscillation independently of said shaft, a row of tines carried by each of said rods and adapted to slide in the slots of said shell a butt plate stationary with one end of said shell lugs on said butt plate, diametrically opposed arms carried by one of said holders for engagement with said lugs for interlocking said shaft and said shell to effect protrusion of said tines from said shell during oscillation of said shaft in one direction and for retracting said tines during oscillation of said shaft in an opposite direction.

4. A picker spindle for a cotton harvesting machine comprising an oscillatable and reciprocable shaft, a shell mounted for rotation on and about the shaft having circumferentially spaced, longitudinally coextensive slots therein, a holder on the shaft in each end of the shell, a plurality of longitudinal rods journaled at their ends in the holders and grouped in radially spaced relationship about the shaft, a row of tines spaced longitudinally on each of the rods and extending into the slots of the shell, a butt plate in one end of the shell, lugs on the butt plate, and a pair of arms on one of the holders cooperating with the lugs to effect extension and retraction of the tines with respect to the shell when the shaft is oscillated during reciprocation thereof.

5. The structure of claim 3, the segments each having a longitudinal coextensive flange turned inwardly at an angle of 90° and an opposite flange turned inwardly at an included angle of less than 90°, the flanges defining bearing surfaces on opposite sides of the slots for the tines during their movement into and out of the shell through the slots.

References Cited in the file of this patent

UNITED STATES PATENTS

| | | |
|---|---|---|
| 457,744 | Lispenard | Aug. 11, 1891 |
| 770,653 | Price | Sept. 20, 1904 |
| 920,227 | Gray | Oct. 27, 1908 |
| 1,208,591 | Lovejoy | Dec. 12, 1916 |
| 1,525,670 | So Relle | Feb. 10, 1925 |
| 1,851,883 | Wooten | Mar. 29, 1932 |
| 2,248,066 | Cory | July 8, 1941 |
| 2,508,401 | Kirk | May 23, 1950 |
| 2,574,822 | Foster | Nov. 13, 1951 |